US008984817B2

(12) United States Patent
Weiden et al.

(10) Patent No.: US 8,984,817 B2
(45) Date of Patent: Mar. 24, 2015

(54) RENEWABLE ENERGY SOURCE INCLUDING AN ENERGY CONVERSION STRUCTURE AND A BEARING COMPONENT

(75) Inventors: Janaki Weiden, Bergisch Gladbach (DE); Joerg Heldmann, Aachen (DE)

(73) Assignee: Saint-Gobain Performance Plastics Pampus GmbH, Willich (DE)

(*) Notice: Subject to any disclaimer, the term of this patent is extended or adjusted under 35 U.S.C. 154(b) by 123 days.

(21) Appl. No.: 12/982,945

(22) Filed: Dec. 31, 2010

(65) Prior Publication Data

US 2011/0162685 A1 Jul. 7, 2011

Related U.S. Application Data

(60) Provisional application No. 61/291,799, filed on Dec. 31, 2009.

(51) Int. Cl.

*H01L 31/042* (2014.01)
*F16M 11/20* (2006.01)
*F24J 2/54* (2006.01)
*F16C 17/02* (2006.01)

(Continued)

(52) U.S. Cl.

CPC ................ *F24J 2/542* (2013.01); *F16C 17/02* (2013.01); *F16C 17/022* (2013.01); *F16C 33/08* (2013.01); *F16C 33/20* (2013.01); *Y02E 10/47* (2013.01); *F24J 2002/5482* (2013.01)

USPC .......................... 52/173.3; 136/244; 508/100

(58) Field of Classification Search

CPC ........ F16C 17/02; F16C 17/022; F16C 33/08; F16C 33/20; F24J 2/542; F24J 2002/5482; Y02E 10/47

USPC ............. 52/173.1, 173.3; 126/621, 622, 623; 136/244, 251; 248/176.1, 237; 508/100

See application file for complete search history.

(56) References Cited

U.S. PATENT DOCUMENTS 4,666,787 A 5/1987 Bickle et al.
4,691,075 A * 9/1987 Murphy ........................ 136/246

(Continued)

FOREIGN PATENT DOCUMENTS

AU 2013205222 A1 * 5/2013
CN 201174671 Y 12/2008

(Continued)

OTHER PUBLICATIONS

International Preliminary Report on Patentability for International Application No. PCT/EP2010/070975 dated Jul. 4, 2012 (10 pages).*

(Continued)

*Primary Examiner* — Basil Katcheves
*Assistant Examiner* — Rodney Mintz
(74) *Attorney, Agent, or Firm* — Chi Suk Kim; Abel Law Group, LLP

(57) ABSTRACT

A power generation structure for generating power from a renewable energy source including a base, an energy conversion structure connected to the base, and an articulating joint between the base and the energy conversion structure, the articulating joint comprising a bearing member having a body including a composite material having a rigid material and a friction-reducing material overlying the rigid material, wherein the rigid material comprises a material selected from the group of consisting of aluminum and stainless steel.

13 Claims, 10 Drawing Sheets

100
102
101
118
115
117
116
109
103
107
108

(51) Int. Cl.
*F16C 33/08* (2006.01)
*F16C 33/20* (2006.01)

(56) References Cited

U.S. PATENT DOCUMENTS

| | | | | |
|---|---|---|---|---|
| 4,930,910 | A | 6/1990 | Mori et al. | |
| 5,003,212 | A * | 3/1991 | Ibe et al. | 310/235 |
| 5,679,743 | A * | 10/1997 | Hirai et al. | 525/88 |
| 5,866,647 | A * | 2/1999 | Massey et al. | 508/100 |
| 6,443,145 | B1 * | 9/2002 | Buron et al. | 126/601 |
| 6,563,040 | B2 * | 5/2003 | Hayden et al. | 136/244 |
| 6,726,994 | B1 | 4/2004 | Araki et al. | |
| 6,770,378 | B1 * | 8/2004 | Lehmann | 428/474.4 |
| 7,705,277 | B2 * | 4/2010 | Noble et al. | 250/203.4 |
| 8,101,849 | B2 * | 1/2012 | Almy et al. | 136/246 |
| 8,118,492 | B2 * | 2/2012 | Weiden et al. | 384/276 |
| 8,188,413 | B2 * | 5/2012 | Kats et al. | 250/203.4 |
| 8,585,293 | B2 * | 11/2013 | Jager et al. | 384/276 |
| 8,609,977 | B2 * | 12/2013 | Jones et al. | 136/246 |
| 8,802,602 | B2 * | 8/2014 | Schmitjes et al. | 508/100 |
| 2003/0000564 | A1 * | 1/2003 | Shingleton et al. | 136/244 |
| 2003/0070705 | A1 * | 4/2003 | Hayden et al. | 136/251 |
| 2004/0071374 | A1 | 4/2004 | Tomita et al. | |
| 2006/0090789 | A1 * | 5/2006 | Thompson | 136/246 |
| 2008/0251115 | A1 * | 10/2008 | Thompson et al. | 136/251 |
| 2008/0314440 | A1 * | 12/2008 | Clemens et al. | 136/251 |
| 2009/0032090 | A1 * | 2/2009 | Kats et al. | 136/251 |
| 2009/0120016 | A1 * | 5/2009 | Hon | 52/173.3 |
| 2009/0180720 | A1 * | 7/2009 | Weiden et al. | 384/276 |
| 2009/0223142 | A1 * | 9/2009 | Shingleton et al. | 52/71 |
| 2010/0080497 | A1 * | 4/2010 | Jaeger et al. | 384/276 |
| 2010/0098360 | A1 * | 4/2010 | Schmitjes et al. | 384/129 |
| 2010/0139741 | A1 * | 6/2010 | Wares | 136/251 |
| 2010/0223865 | A1 * | 9/2010 | Gonzalez Moreno | 52/173.3 |
| 2011/0017259 | A1 * | 1/2011 | Mann | 136/244 |
| 2011/0041834 | A1 * | 2/2011 | Liao | 126/605 |
| 2011/0049834 | A1 * | 3/2011 | Natu | 280/279 |
| 2011/0072740 | A1 * | 3/2011 | Dieter et al. | 52/173.3 |
| 2011/0079214 | A1 * | 4/2011 | Hon | 126/573 |
| 2011/0114080 | A1 * | 5/2011 | Childers et al. | 126/601 |
| 2011/0131895 | A1 * | 6/2011 | Dempsey | 52/157 |
| 2011/0146661 | A1 * | 6/2011 | Dudas | 126/575 |
| 2011/0150375 | A1 * | 6/2011 | Jaeger et al. | 384/42 |
| 2011/0176757 | A1 * | 7/2011 | Heldmann et al. | 384/29 |
| 2011/0203633 | A1 * | 8/2011 | Richardson | 136/244 |
| 2011/0219759 | A1 * | 9/2011 | Blitz et al. | 60/327 |
| 2011/0262064 | A1 * | 10/2011 | Burgeff et al. | 384/220 |
| 2011/0290305 | A1 * | 12/2011 | Hoffmann et al. | 136/251 |
| 2012/0101011 | A1 * | 4/2012 | Makino et al. | 508/100 |
| 2012/0222372 | A1 * | 9/2012 | Hilber | 52/173.3 |
| 2012/0270761 | A1 * | 10/2012 | Kamiya et al. | 508/108 |
| 2012/0275731 | A1 * | 11/2012 | Ziegler et al. | 384/26 |
| 2012/0312348 | A1 * | 12/2012 | Fereday | 136/245 |
| 2013/0023451 | A1 * | 1/2013 | Matsuhisa et al. | 508/103 |
| 2013/0153007 | A1 * | 6/2013 | Plesniak | 136/251 |
| 2013/0180568 | A1 * | 7/2013 | Hartelius | 136/246 |
| 2014/0326294 | A1 * | 11/2014 | Inoue | 136/246 |

FOREIGN PATENT DOCUMENTS

| | | | |
|---|---|---|---|
| CN | 201207625 | Y | 3/2009 |
| DE | 202005006868 | U1 * | 10/2006 |
| DE | 102007052338 | A1 | 5/2009 |
| DE | 102008049747 | A1 * | 4/2010 |
| EP | 394518 | A * | 10/1990 |
| EP | 848031 | A1 * | 6/1998 |
| GB | 1236102 | A | 6/1971 |
| JP | S61189932 | A | 8/1986 |
| JP | 2000117888 | A * | 4/2000 |
| JP | 2000136397 | A * | 5/2000 |
| JP | 2003021144 | A | 1/2003 |
| JP | 2007258357 | A * | 10/2007 |
| KR | 10-0385410 | B | 8/2003 |
| WO | 0029210 | A1 | 5/2000 |
| WO | 2004/105457 | A2 | 12/2004 |
| WO | WO 2007113157 | A1 * | 10/2007 |
| WO | 2008128579 | A1 | 10/2008 |
| WO | 2009/108273 | A2 | 9/2009 |
| WO | WO 2010038137 | A1 * | 4/2010 |
| WO | WO 2011060467 | A1 * | 5/2011 |
| WO | 2011080335 | A2 | 7/2011 |
| WO | WO 2011080335 | A3 * | 6/2012 |

OTHER PUBLICATIONS

Machine Translation of WO 2008128579 A1 retrieved from Espacenet.com on Jan. 16, 2014 (7 pages).*

International Search Report from PCT Application No. PCT/EP2010/070975 dated Apr. 27, 2012, 2 pgs.

* cited by examiner

RENEWABLE ENERGY SOURCE INCLUDING AN ENERGY CONVERSION STRUCTURE AND A BEARING COMPONENT

CROSS-REFERENCE TO RELATED APPLICATION(S)

The present application claims priority from U.S. Provisional Patent Application No. 61/291,799, filed Dec. 31, 2009, entitled "Renewable Energy Source Including an Energy Conversion Structure and a Bearing Component," naming inventor Janaki Weiden, which application is incorporated by reference herein in its entirety.

BACKGROUND

1. Field of the Disclosure

The following disclosure relates to renewable energy sources, and particularly a power generation structure for generating power from a renewable energy source comprising an articulating joint having a bearing.

2. Description of the Related Art

Renewable energy sources are becoming more prominent as means to reduce, and potentially replace, non-renewable energy sources. Of the renewable energy sources available, including for example, wind, solar, and geothermal sources, various mechanisms are currently being employed for capturing the naturally-available energy and converting it to electrical energy for use in our daily lives. Notably, the renewable energy sources are being converted to electrical energy via power generation structures that are tailored to the renewable energy source. For example, currently, wind power is being harnessed by power generation structures in the form of wind turbines having massive propellers, which generate electricity as wind turns the propellers. Solar power is being captured by farms of solar panels that convert beams of radiant energy from the sun into electrical power.

Certain regions of the globe may be more suitable than other regions for harnessing renewable energy sources, and thus, certain environments of the earth are more suitable for the deployment of particular power generation structures than other environments. For example, a desert at the equator of the earth receives a greater amount of direct sunlight than a region at the north pole, thus making the desert region more suitable for harnessing solar power. Moreover, to some extent, the success of certain energy conversion structures requires moving parts, and some of the various environments where renewable energy sources are being deployed can be extreme and/or corrosive (e.g., desserts, ocean shorelines, etc.).

Composite bearing components that have a metallic support material and an overlying friction-reducing material are known and have been used in ranging applications, including most notably, the automotive industry. See, for example, EP 0 394 518 A1. Moreover, sealing devices having similar constructions, including for example, seal rings, lip seals, energized seals, and the like, have been used in the automotive industry.

Yet, as the industries surrounding renewable energy sources continue to mature, improvements in the components responsible for ensuring power generation will be demanded.

SUMMARY

According to one aspect, a power generation structure for generating power from a renewable energy source includes a base, an energy conversion structure connected to the base, and an articulating joint between the base and the energy conversion structure. The articulating joint includes a bearing member having a body including a composite material having a rigid material and a friction-reducing material overlying the rigid material, wherein the rigid material comprises a material selected from the group of consisting of aluminum and stainless steel.

According to another aspect, a power generation structure for generating power from a renewable energy source includes a base, a solar panel connected to the base at an articulating joint configured to allow movement of the solar panel relative to the base, wherein the articulating joint includes a bushing having a body made of a composite material having a rigid material and a friction-reducing material overlying the rigid material. The rigid material includes a material selected from the group of materials consisting of aluminum and stainless steel, and wherein the friction-reducing material comprises a material selected from the group of materials consisting of graphite, glass, and a combination thereof.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following describes power generation structures tailored to utilizing renewable energy sources, and particularly articulating joints within the power generation structures having bearing members for use with energy conversion structures designed to harness renewable energy sources in various environments. The bearing members can facilitate movement of key components in harsh environments, including environments that may cause excessive corrosion and/or mechanical failure in other bearing members.

Figure 1:
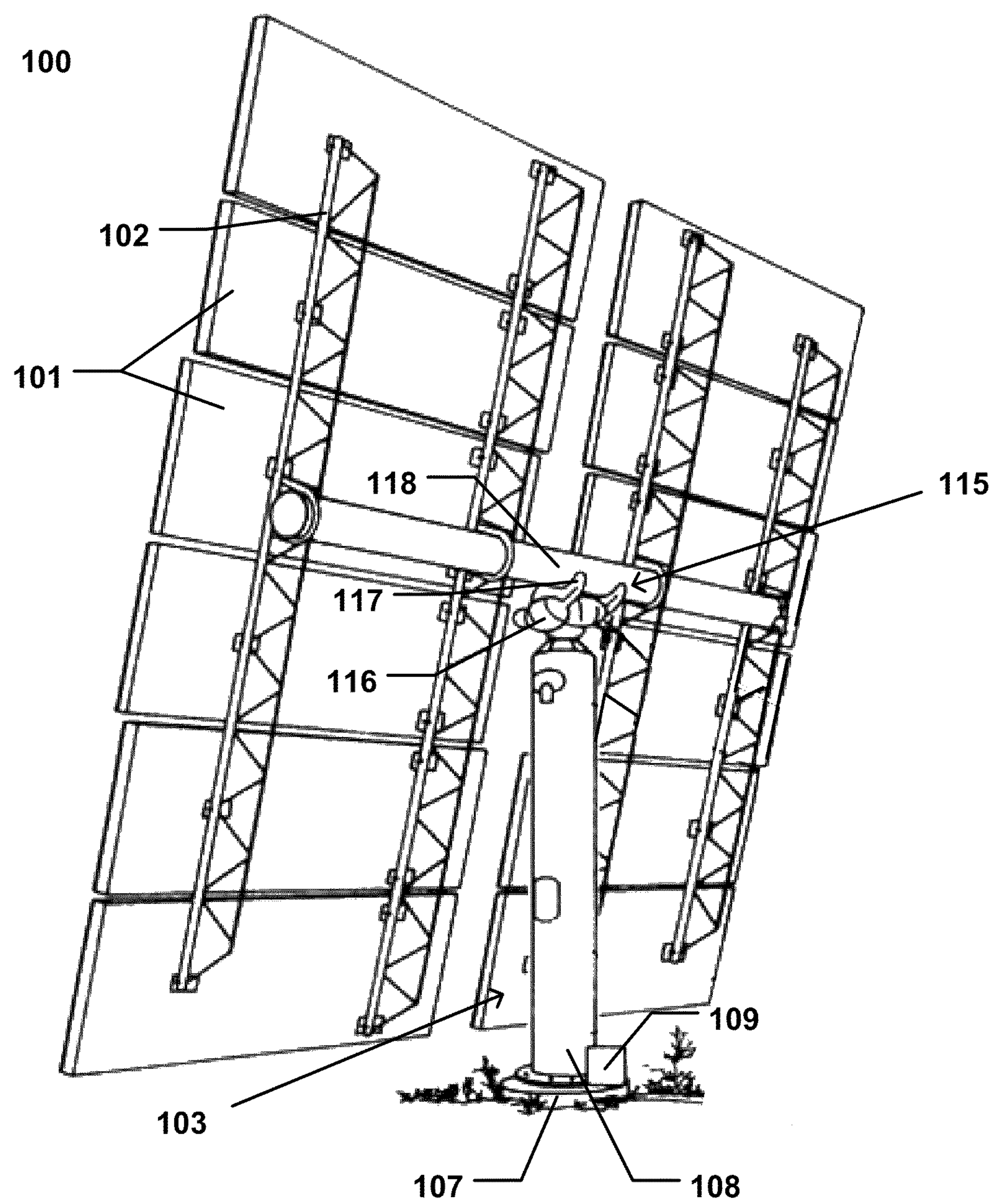
FIG. 1 includes an illustration of a power generation structure in accordance with an embodiment.

FIG. 1 includes an illustration of a power generation structure in accordance with an embodiment. In particular, the structure 100 may be particularly suitable for utilizing solar power, and converting solar energy to electrical energy. As illustrated, the structure 100 can include a base 103, including a foundation 107, which may be directly attached to the ground for securing the structure 100 in its location. As further illustrated, the base 103 can include a pedestal 108 directly connected to the foundation 107 and extending upward from the foundation 107 for support and connection of other components of the structure 100. As further illustrated, the base 103 can include a power terminal 109 attached to the foundation 107, which may supply energy to motors used to move portions of the structure 100.

The structure 100 can further include an articulating joint 115 attached to the base 103, and in particular, directly attached to the pedestal 108, and configured to move an elongated member 118 connected to the articulating joint 115. The articulating joint 115 is reference to a joint between two components, wherein one of the components is designed to move relative to the other component. Types of movement can include simple translation (along one axis), compound translation (along two or more axes), simple rotation (around one axis) compound rotation (around two or more axes), and a combination thereof. The articulating joint 115 can include a drive mechanism 116 that may include a motor, which aids movement of the elongated member 118. In particular, the drive mechanism 116 can be programmed such that it changes the position of the elongated member 118, and thus, the position of the panels 101 attached to the elongated member 118, such that the panels 101 can follow the position of the sun in the sky for efficient collection and/or direction of radiant beams of energy from the sun. In particular instances, the drive mechanism 116 is programmed with particular azimuth and declination coordinates that it traces through a duration of time according to a particular day.

The articulating joint 115 can include a housing 117 connected to the drive mechanism 116 and configured to support the elongated member 118. As will be appreciated, the housing 117 can include components that facilitate the movement of the elongated member, including for example bearing members, suitable for facilitating the sliding of the elongated member 118 around portions of the housing 117.

As will be appreciated, movement of the elongated member 118 can facilitate movement of portions of the structure 100, and in particular, panels 101 that are attached to the elongated member 118 via support structures 102. As illustrated, the structure 100 can include an array of panels 101 attached to a single base 103. According to one embodiment, the panels 101 can be energy conversion structures, such as solar panels, configured to convert radiant energy of the sun into electrical power. In another embodiment, the panels 101 of the article can be reflectors, such as mirrors, designed to re-direct the radiant energy of the sun to nearby energy conversion structures, such as solar panels.

While not illustrated, the structure 100 can include other articulating joints, such as between the foundation 107 and the pedestal 108 for rotation of the pedestal relative to the foundation 107. Any articulating joint may utilize a bearing member according to embodiments herein. Moreover, it will be appreciated that other energy conversion structures can utilize an articulating joint 115, and particularly a bearing member within the articulating joint 115. For example, another suitable energy conversion structure can include a wind turbine, which may include a plurality of propellers (or vanes) extending from a central structure, wherein the turbines must be allowed to rotate for the generation of electrical power, and thus, may utilize a bearing member at an articulating joint within the structure.

Figure 2A:
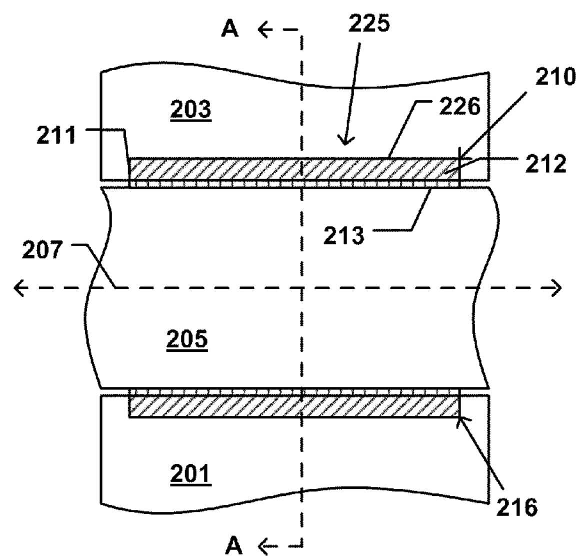
FIG. 2A includes a cross-sectional illustration of a portion of an articulating joint according to an embodiment.
Figure 2B:
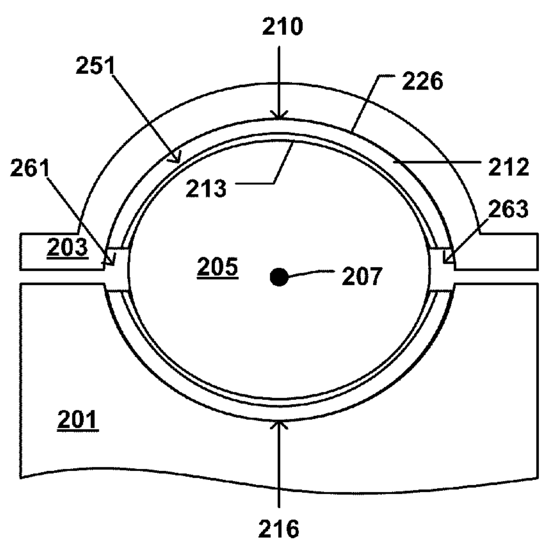
FIG. 2B includes a cross-sectional illustration of a portion of an articulating joint according to an embodiment.
Figure 2C:
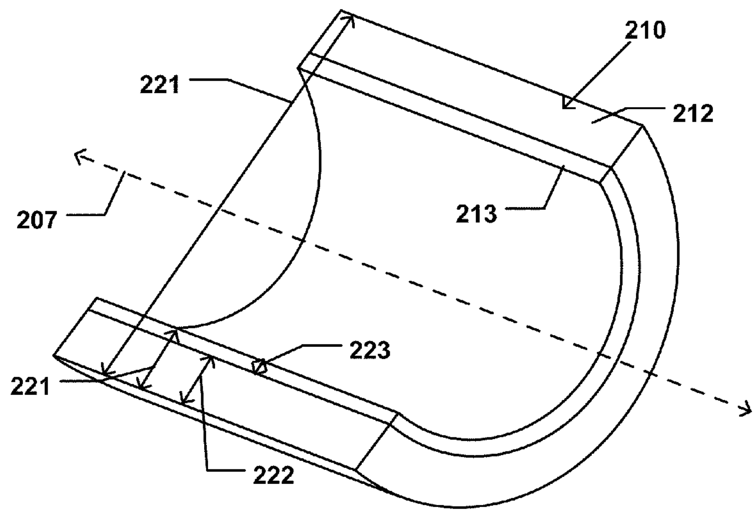
FIG. 2C includes a perspective view illustration of a bearing member according to an embodiment.

FIGS. 2A-2C include illustrations of a portion of an articulating joint and/or a bearing member for use with an power generation structure designed to utilize a renewable energy source. FIG. 2A includes a cross-sectional illustration of a portion of an articulating joint in accordance with an embodiment. In particular, FIG. 2A includes an illustration of a portion of a lower housing 201, a portion of an upper housing 203, and a portion of an elongated member 205 disposed between the lower housing 201 and upper housing 203. The articulating joint can include a bearing member 210 coupled to the upper housing 203 and configured to contact the elongated member 205. Moreover, FIG. 2A includes a bearing member 216 coupled to the lower housing 201 and configured to engage a portion of the elongated member 205. The bearing members 310 and 316 can provide a surface suitable for the movement (e.g., rotation) of the elongated member relative to the upper housing 203 and the lower housing 316.

According to one embodiment, the bearing member 210 can have a body 211 made of a composite material including a rigid material 212 and a friction-reducing material 213 overlying a major surface of the rigid material 212. In particular embodiments, the friction-reducing material 213 can be bonded directly to a surface of the rigid material 212 to form the composite of the body 211.

In certain designs, the bearing member 210 can be contained within a recess 225 formed in an inner surface 226 within the upper housing 203 to suitably secure the bearing member 210 relative to the upper housing 203. In particular instances, the body 211 of the bearing member, and particularly the rigid material 212, can be in direct contact with the inner surface 226. It will be appreciated, that the bearing member 216 can be contained within a similar recess within the lower housing 201.

During operation of the articulating joint, the elongated member 205 may be rotated about the longitudinal axis 207 such that portions of the structure 100, such as the panels 101, may be articulated with the elongated member 205. However, the upper housing 203 and lower housing 201 may not necessarily need to be articulated, and accordingly, the bearing members 210 and 216, provide a low-friction, sliding interface between the upper housing 203 and the elongated member 205 and the lower housing 201 and the elongated member 205, respectively.

FIG. 2B includes a cross-sectional illustration of a portion of an articulating joint in accordance with an embodiment. In particular, FIG. 2B includes a cross-sectional illustration of the portion of the articulating joint of FIG. 2A within the plane AA. As illustrated, the upper housing 203 and lower housing 201 can include arcuate surfaces complementary to the arcuate surface of the elongated member 205, such that the exterior surfaces of the elongated member 205 are complementary to a circular-shaped opening 251 formed by the joining of the upper housing 203 and lower housing 201. As illustrated in FIG. 2B, within the circle-shaped opening 251, the upper housing 203 and the lower housing 201 can surround a majority of the periphery of the elongated member 205. The bearing member 210 can be disposed between the upper housing 203 and the elongated member 205, while the bearing member 216 can be disposed between the lower housing 201 and the elongated member 205.

Notably, the bearing member 210 may not extend along the entire inner surface 226 of the upper housing 203, such that gap regions 261 and 263 are formed, wherein the bearing member 210 is not overlying the inner surface 226 of the upper housing 203 and the inner surface 226 is spaced apart from the elongated member 205 without the intervening bearing member 210. A similar region is formed between the lower housing 201 and the elongated member 205, in instances where the bearing member 216 does not overlie the entire inner surface of the lower housing 201.

While not illustrated, the upper housing 203 may be coupled too, such as directly connected to the lower housing 201. According to one embodiment, the upper housing 203 can be fastened to the lower housing 201. As such, the upper housing 203 and lower housing 201 may sandwich the elongated member 205, and thus the bearing member 210 and 216 facilitate rotation of the elongated member 205 about the longitudinal axis 207 while being disposed between the upper housing 203 and lower housing 201.

FIG. 2C includes a perspective illustration of a bearing member in accordance with an embodiment. In particular, the bearing member 210 can have a body 211 which is a composite including the rigid material 212 and friction-reducing material 213. Particular aspects of the construction of the body 211 including materials of the rigid material 212, friction-reducing material 213, and other material components will be provided in more detail herein. In particular, the body 211 can have a curved shape that extends circumferentially around a central axis (e.g., the longitudinal axis 207) to facilitate coupling of the body 211 with the elongated member 205. As will be appreciated, the friction-reducing material 213 can be disposed on the interior surface of the body 211, such that it is configured to engage the elongated member 205 and provide a suitable sliding surface for rotation of the elongated member 205 relative to the friction-reducing material 213.

The bearing member 210 can have an arcuate shape as viewed in cross-section to the longitudinal axis 207. In accordance with one embodiment, the bearing member 210 can be a simple bushing, having a cylindrical or partially cylindrical shape. For example, as illustrated, the bearing member 210 can have a semi-circular shape as viewed in cross-section to the longitudinal axis 207. Accordingly, in certain instances the bearing member 210 can have a body 211 that extends through a portion of a circumference of a circle. For example, the body 211 can extend through a central angle based upon a point on the longitudinal axis 207 of 180° or less.

As further illustrated in FIG. 2C, the body 211 can have an outer diameter 271 as measured in a direction perpendicular to the longitudinal axis 207 between the outer surfaces of the body 211. In accordance with an embodiment, the bearing member 210 has a body 211 having an outer diameter 271 of at least about 500 mm. In other embodiments, the outer diameter 271 can be at least about 100 mm, such as at least about 200 mm, at least about 300 mm, at least about 400 mm, or even at least about 500 mm. In particular instances, the body 211 can have an outer diameter 271 that is within a range between about 50 mm and 1000 mm. Such as between about 50 mm and 750 mm, between about 50 mm and 500 mm between about 100 mm and 500 mm, or even between about 200 mm and 500 mm. Use of a bearing member 210 having a body 211 with an outer diameter 271 as noted herein may provide a bearing member 210 having suitable mechanical characteristics (e.g., stiffness) suitable for use in demanding applications, such as those articles utilizing renewable energy sources.

Moreover, the body 211 can have an average thickness 221 as measured in a direction perpendicular to the longitudinal axis 207 through the rigid material 212 and the friction-reducing material 213. In accordance with an embodiment, the bearing member 210 can have an average thickness 221 of at least about 30 mm. In other embodiments, the average thickness can be at least about 40 mm, at least about 50 mm, at least about 75 mm, or even at least about 80 mm. In other embodiments, the average thickness 221 can be within a range between about 35 mm and 500 mm, such as between about 35 mm and 300 mm, or even between about 35 mm and 200 mm. Use of a bearing member 210 having a body 211 with an average thickness 221 as noted herein may provide a bearing member 210 having suitable mechanical characteristics (e.g., stiffness) suitable for use in demanding applications, such as those articles utilizing renewable energy sources.

As further illustrated in FIG. 2C, the rigid material 212 can have an average thickness 222 as measured perpendicular to the longitudinal axis 207 through the thickness of the rigid material 212. In certain instances, it will be appreciated that the rigid material 212 can be formed of a metal or metal alloy, and particularly, aluminium or stainless steel. As will be understood, stainless steel is a steel material having at least 10.5% chromium. In embodiments utilizing a rigid material 212 consisting essentially of stainless steel, the average thickness 222 can be at least 35 mm. Still, in designs utilizing a rigid material 212 consisting essentially of stainless steel, the average thickness 222 can be at least about 40 mm, such as at least 45 mm, at least about 50 mm, or even at least about 60 mm. In particular instances, the rigid material 212 can consist essentially of stainless steel, and the average thickness 222 can be within a range between about 35 mm and 200 mm, such as between about 35 mm and 150 mm, or even between about 35 mm and 100 mm.

In other instances, the rigid material 212 can be formed such that it consists essentially of aluminium. In such embodiments, the rigid material 212 can have an average thickness 222 of at least about 70 mm. Still, embodiments utilizing a rigid material 212 that consists essentially of aluminium, the average thickness 222 can be at least about 75 mm, such as at least about 80 mm, at least about 90 mm or even at least about 100 mm. In accordance with one embodiment, the bearing member can be formed such that the rigid material 212 consists essentially of aluminium, and the average thickness 222 of the rigid material 212 can be within a range between about 70 mm and about 200 mm, such as between about 70 mm and 175 mm or even between about 75 mm and about 150 mm.

As further illustrated in FIG. 2C, the bearing member 210 may be formed such that the friction-reducing material 213 has a particular thickness. For example, the friction-reducing material 213 can have an average thickness 223 as measured in a direction perpendicular to the longitudinal axis 207 that can be at least about 0.1 mm, such as at least about 0.2 mm, at least about 0.3 mm or even at least about 1 mm. In accordance with one embodiment, the bearing member can be formed such that the friction-reducing material 213 has an average thickness 223 within a range between about 0.1 mm and about 25 mm, such as between about 0.1 mm and about 15 mm, between about 0.1 mm and about 10 mm, or even between about 0.1 mm and about 5 mm.

Figure 3A:
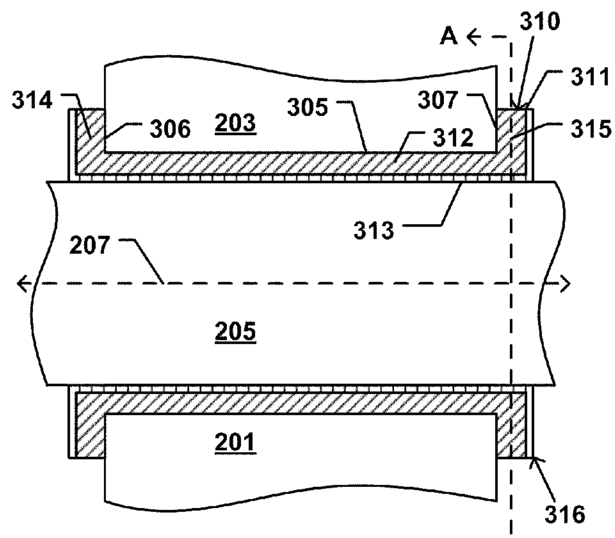
FIG. 3A includes a cross-sectional illustration of a portion of an articulating joint according to an embodiment.
Figure 3B:
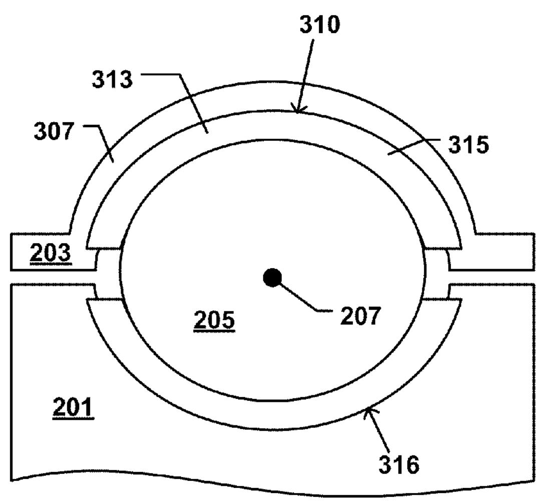
FIG. 3B includes a cross-sectional illustration of a portion of an articulating joint according to an embodiment.
Figure 3C:
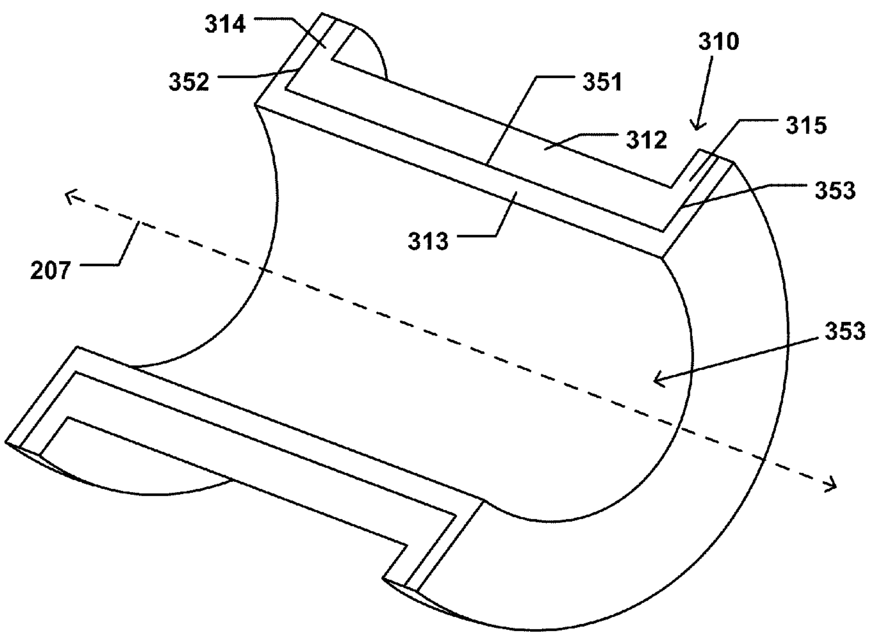
FIG. 3C includes a perspective view illustration of a bearing member according to an embodiment.

FIGS. 3A-3C include illustrations of an articulating joint and/or bearing member in accordance with an embodiment. In particular, FIG. 3A includes a cross-sectional illustration of an articulating joint incorporating a bearing member in accordance with an embodiment. As illustrated, the articulating joint can include a portion of a lower housing 201, a portion of an upper housing 203, and an elongated member 205 extending between the lower housing 201 and upper housing 203. Furthermore, the articulating joint can include a bearing member 310 disposed between a portion of the upper housing 203 and the elongated member 205. The bearing member 310 can have a body 311 formed of a composite material including a rigid material 312 and a friction-reducing material 313 configured to engage the elongated member 205 and facilitate the articulation, and particularly the rotation, of the elongated member 205 around the longitudinal axis 207 relative to the upper housing 203.

As further illustrated, the articulating joint can include a bearing member 316 disposed between the lower housing 201 and elongated member 205. The bearing member 316 can include the same features as the bearing member 210.

With respect to the bearing member 310, the body 311 of the bearing member 310 can be formed such that it includes a first flange 315 extending from an end of the body 311 and configured to engage an outer side surface 307 of the upper housing 203. Additionally, the body 311 of the bearing member 310 can include a second flange 314 extending from an end of the body 311 opposite of the flange 315 and configured to engage and directly connect to an outer side surface 306 of the upper housing 203. In particular, the bearing member 310, and its flanges 314 and 315 are configured to engage the outer side surfaces 306 and 307 of the upper housing 203, thereby locking the position of the bearing member 310 relative to the upper housing 203. As will be appreciated, the bearing member 310 further includes an inner surface of the rigid material 312 that is configured to engage and directly contact an inner surface 305 of the housing 203.

As further illustrated, the bearing member 310 can be formed such that the friction-reducing material 313 overlies exterior surfaces of the flanges 314 and 313, such that the friction-reducing material 313 extends radially along the outer peripheral surfaces of the flanges 314 and 315.

FIG. 3B includes a cross-sectional illustration of a portion of the articulating joint within the plane AA as illustrated in FIG. 3A. As illustrated, the upper housing 203 and lower housing 201 can have arcuate shapes configured to extend around a majority of the external surfaces of the elongated member 205. As further illustrated, the bearing member 310 is configured to engage the upper housing 203 and further configured to engage a portion of the arcuate surface of the elongated member 205, such that the elongated member 205 can freely rotate relative to the upper housing 203. Likewise, the bearing member 316 is disposed between the lower housing 201 and elongated member 205 such that the elongated member 205 can rotate relative to the lower housing 201.

As further illustrated, the flange 315 of the bearing member 310 can extend radially at an end of the body 311 such that it overlies a portion of the outer side surface 307 of the upper housing 203 and locks the position of the bearing member 310 relative to the upper housing 203. As further illustrated in FIG. 3B, the friction-reducing material 313 extends along the entire external surface of the body 311 including the flange 315. The bearing member 316 can have the same features as discussed above, with regard to the bearing member 310.

FIG. 3C includes a perspective view illustration of the bearing member 310. As illustrated, the bearing member 310 can have a body 311 which is a composite material including a rigid material 312 and a friction-reducing material 313 overlying a surface of the rigid material 312. The bearing member 310 can have a generally arcuate shape as viewed in cross-section to the longitudinal axis 207, such that it is in the shape of a flanged bushing. In particular instances, the bearing member 310 can have a semi-circular shape as viewed in cross-section to the longitudinal axis 207.

Moreover, as further illustrated in FIG. 3C the, friction-reducing material 313 can extend along an interior surface 351 of the rigid material 312 as well as inner side surfaces 352 and 353 of the flanges 314 and 315, respectively. When the bearing member 310 is disposed within the articulating joint as depicted in FIGS. 3A and 3B, the elongated member 205 can be disposed within the cavity 355 of the bearing member 310 and articulate (e.g., rotate) within the cavity 355.

Figure 4A:
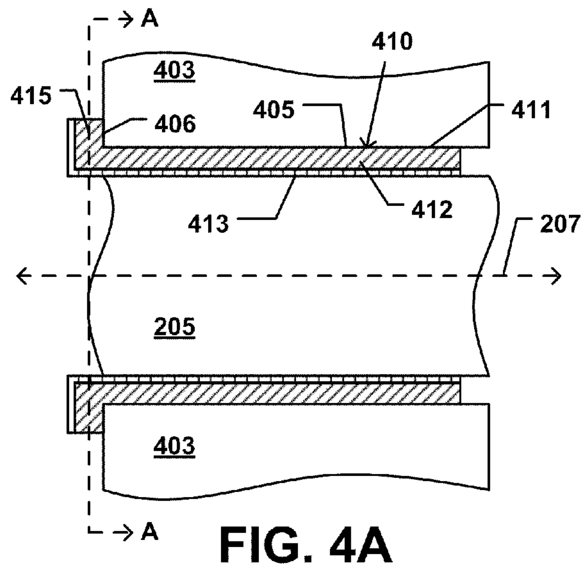
FIG. 4A includes a cross-sectional illustration of a portion of an articulating joint according to an embodiment.
Figure 4B:
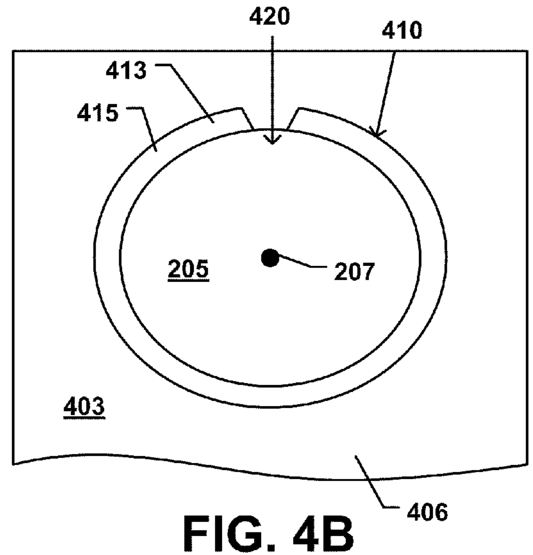
FIG. 4B includes a cross-sectional illustration of a portion of an articulating joint according to an embodiment.
Figure 4C:
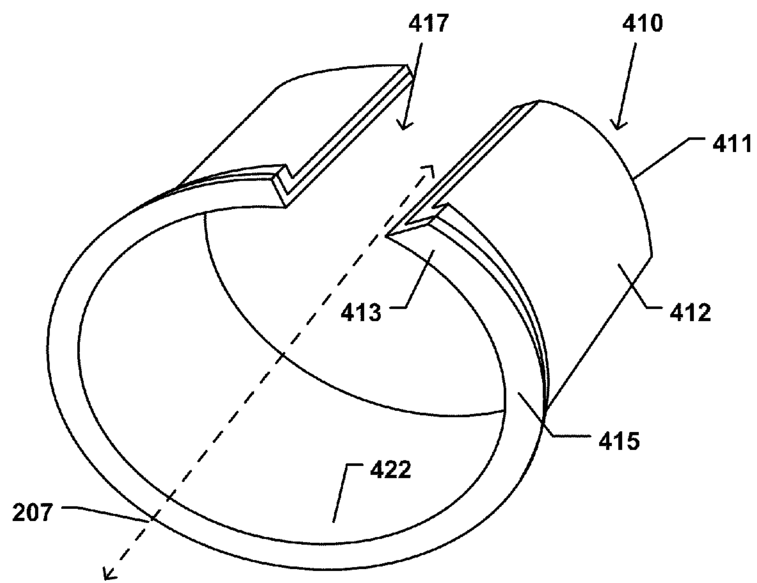
FIG. 4C includes a perspective view illustration of a bearing member according to an embodiment.

FIGS. 4A-4C include illustrations of an articulating joint and/or a bearing member in accordance with an embodiment. In particular, FIG. 4A includes a cross-sectional illustration of a portion of an articulating joint in accordance with an embodiment. Notably, the articulating joint can include those components previously described in other embodiments, notably including a housing 403, an elongated member 205 extending through an opening in the housing 403, and a bearing member 410 disposed between the housing 403 and the elongated member 205. In particular, the design of the articulating joint illustrated under FIG. 4A utilizes a single bearing member (as opposed to two bearing members) to be disposed between the housing 403 and the elongated member 205, wherein the bearing member is configured to engage the elongated member 205 and facilitate articulation (e.g., rotation about the longitudinal axis 207) of the elongated member 205 relative to the housing 403. More particularly, the rigid material 412 is configured to be abutting a surface of the housing 403, while the friction-reducing material 413 is configured to abut a surface of the elongated member 205 such that it is capable of rotation around the longitudinal axis 207 relative to the housing 403.

The bearing member 410 can have a body 411 formed of a composite material including a rigid material 412 and a friction-reducing material 413 overlying a surface of the rigid material 412. As further illustrated, the bearing member 410 can have a body 411, including a flange 415 extending radially from an end of the body 411. The flange 415 can be formed such that at least a portion of the flange 415 is configured to engage an outer side surface 406 of the housing 403.

FIG. 4B includes a cross-sectional illustration of a portion of the articulating joint of FIG. 4A within the plane AA. As illustrated, the articulating joint includes a housing 403 which includes an opening 420 configured to engage the elongated member 205 therein. Additionally, the opening 420 is configured to engage the bearing member 410 therein. As illustrated, the bearing member 410 can be formed such that the flange 415 extends radially from the longitudinal axis and extends along a portion of the outer side surface 406 of the housing 403. Such a configuration facilitates locking the position of the bearing member 410 relative to the housing 403.

FIG. 4C includes a perspective illustration of the bearing member 410 in accordance with an embodiment. In particular, the bearing member 410 can be in the form of the cup-shaped bushing. Notably, the cup-shaped bushing has a generally cylindrical shape extending almost completely around the longitudinal axis 207. The cup-shaped bushing can include a slit 417 that extends axially along the longitudinal axis 207 of the body 411, such that the body 411 does not form a complete circle (less than) 360° as viewed in cross-section to the longitudinal axis 207. As further illustrated in FIG. 4C, the bearing 410 can have a flange 415 that can extend radially from an end of the body 411. As illustrated, the internal surfaces 422 of the bearing member 410 can include the friction-reducing material 413 to facilitate rotation of the elongated member 205 therein. Moreover, the bearing member 410 can be formed such that the friction-reducing material 413 overlies an exterior surface of the flange 415, such that the friction-reducing material 313 extends radially along the outer peripheral surfaces of the flange 415.

The foregoing bearing members can be formed such that the body is made of a composite material including a rigid material and friction-reducing material as described herein. In accordance with an embodiment, the bearing members herein can have particular characteristics, including but not limited to, corrosion resistance, wear resistance, and stick-slip properties making them particularly well-suited for use in power-generation structures.

While the foregoing has described certain key features of bearing members, the following provides further details of particular aspects that may be incorporated into the bearing members of the embodiments herein. In an embodiment, a bearing member can include a rigid material, an intermediate material applied directly thereto, and a friction-reducing material applied to the intermediate material, in which excellent adhesion of the friction-reducing material to the rigid material is ensured over the long term and whose production makes do without use of ecologically problematical processes for surface pretreatment.

In an embodiment, a bearing member can include an intermediate material comprising at least one functionalized thermoplastic polymer with incorporation of functional groups of the formula

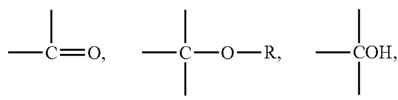

—COOH and/or —COOR, where the radicals R are cyclic or linear organic radicals having from 1 to 20 carbon atoms. If the organic radical R contains, for example, only one carbon atom, the functional group

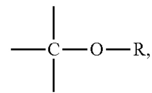

preferably has the following formula:

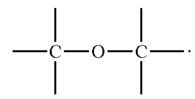

The functional groups can be incorporated into the thermoplastic polymer (A) by addition of at least one modifying agent (B). Suitable modifying agents can include maleic acid, itaconic acid, citraconic acid, derivatives thereof, and a combination thereof. In particular, the modifying agents can include an anhydride of maleic acid, anhydride of itaconic acid, anhydride of citraconic acid, derivatives thereof, and a combination thereof. Here, the ratio of the polymer (A) to the modifying agent (B) can be from 99.9 mol % of (A): 0.1 mol % of (B) to 80 mol % of (A): 20 mol % of (B). The melt volume flow rate (MVR at 50° C.> as melting point and under a load of 7 kg) can be on the order of from 0.1 to 1000 $mm^3$/sec. The MVR is an index of the melt flow of the polymer and can thus be used as a rough estimate of the molecular weight. Ideally, the MVR is in the order of 5 to 500 $mm^3$/sec, particularly preferably in the range from 10 to 200 $mm^3$/sec.

In an embodiment, the bearing member can be characterized by adhesion of the friction-reducing material to the support material brought about by the intermediate material including a functionalized thermoplastic polymer having functional groups of the abovementioned type. Owing to the excellent adhesion to even an unpretreated surface of the rigid material, in particular to cold-rolled stainless steel, cold-rolled and subsequently electrolytically zinc-plated stainless steel, aluminum, ecologically problematical and disposal-intensive wet chemical pretreatment processes, in particular chromating, can be dispensed with. Physical processes for surface pretreatment (e.g. plasma pretreatment by corona discharge) as are described, for example, in EP 0 848 031 B1 in which a functionalized thermoplastic fluoropolymer is likewise described as constituent of a laminate are no longer necessary, as studies carried out by the applicant have shown. The process for producing the bearing member can therefore be carried out at significantly lower costs compared to the prior art.

In an embodiment, the at least one functionalized thermoplastic polymer of the intermediate material can be a functionalized thermoplastic fluoropolymer, including for example, an ethylene-tetrafluoroethylene copolymer (ETFE), perfluoroalkoxyethylene (PFA) or tetrafluoroethylene-perfluoro(methyl vinyl ether) copolymer (MFA), and a combination thereof. In particular instances, the at least one functionalized thermoplastic polymer of the intermediate material can consist essentially of ethylene-tetrafluoroethylene copolymer (ETFE) being particularly preferred.

The intermediate material can include not only the at least one functionalized thermoplastic polymer but also a copolymer of perfluoro (alkyl vinyl ether) of the formula: $CF_2$═CF—O—$R_1$, where $R_1$ is a perfluoroethyl, perfluoro-n-propyl, a perfluoro-n-butyl radical, tetrafluoroethylene, or a combination thereof.

The thickness of the intermediate material can correspond essentially to the roughness of the rigid material, defined as the distance $R_{max}$ between the maximum profile peak height and the maximum profile valley depth of the roughness profile of the surface of the rigid material. In this way, it can be ensured that a sufficiently thick adhesive layer is applied to the rigid material so that a full-area adhesive bond between friction-reducing material and the rigid material is ensured. The adhesive layer should also not be made too thick. In this case, there would be a risk that, on joining the layers, parts of the adhesive layer could be pressed out from the adhesive bond or cohesive rupture could occur within parts of the adhesive layer projecting above the roughness profile of the rigid material surface when the bearing member is subjected to shear stress.

In another embodiment, the intermediate material can comprise two layers of the functionalized thermoplastic polymer having functional groups of the formula

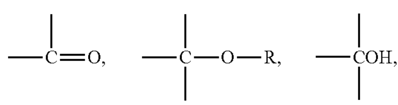

—COOH and/or —COOR. A metallic intermediate material can be embedded between the two layers. Improved calibratability of the material can be achieved in this way. The metallic intermediate material can here be configured as expanded metal. The metallic intermediate material can comprise stainless steel, aluminum, or bronze. In particular instance, the metallic intermediate material can be a woven material, comprising lengths of a metallic material. For example, in certain designs, the metallic intermediate material includes a metal mesh material.

To improve the mechanical and general physical properties of the bearing member, the intermediate material can contain fillers for increasing and/or improving the thermal conductivity and/or the wear properties of the bearing member. Particularly suitable fillers can include fibers, inorganic materials, thermoplastic materials, or mineral materials, or mixtures thereof. Examples of suitable fibers can include glass fibers, carbon fibers, aramids and a combination thereof. Examples of inorganic materials can include ceramic materials, carbon, glass, graphite, aluminum oxide, molybdenum sulfide, bronze, silicon carbide, and a combination thereof. The inorganic materials can be in the form of woven fabrics, powders, spheres or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), and a combination thereof. Examples of suitable mineral materials can include wollastonite, barium sulphate, and a combination thereof.

The proportion of filler in the intermediate material can be 1-40% by volume, and more particularly, 5-30% by volume of the total volume of the intermediate material. The thickness of the intermediate material can be in the range from 0.01 to 0.1 mm, in particular from 0.01 to 0.5 mm.

In an embodiment, the rigid material used in the bearing member can have a surface of a varying nature. The rigid material can have a smooth surface, a roughened surface, and/or a structured surface (for example as achieved by brushing, sandblasting, embossing of a structure). The surface of the rigid material utilized for bonding of the friction-reducing material thereto can also have a surface-upgraded surface, such as an electrolytically zinc-plated surface.

The rigid material can consist of stainless steel, in particular cold-rolled stainless steel or matt zinc-plated stainless steel, aluminum or a combination thereof. In a particular embodiment, the cold-rolled steel can be material number 1.0338 or 1.0347. In another particular embodiment, the stainless steel can be material No. 1.4512 or 1.4720. In particular instances, the rigid material can consist essentially of stainless steel. In other designs, the bearing member can be formed such that the rigid material consists essentially of aluminium.

The friction-reducing material applied to the intermediate material can comprise a fluoropolymer. For example, in certain instances, the friction-reducing material can include a polymer material such as polytetrafluoroethylene, fluorinated ethylene-propylene, polyvinylidenfluoride, polychlorotrifluoroethylene, ethylene chlorotrifluoroethylene, perfluoroalkoxypolymer, polyacetal, polybutylenterephtalate, polyimide, polyetherimide, polyetheretherketone, polyethylene, polysulfone, polyamid, polyphenylenoxide, polyphenylensulfide, polyurathane, polyester, polyether ether ketone (PEEK), and a combination thereof. In a particular embodiment, the friction-reducing material can include a PTFE compound layer. Here, the friction-reducing material can be configured as a perforated plastic film for increasing the conductivity. In certain instances, the friction-reducing material consists essentially of PTFE.

In an embodiment, the bearing member has excellent sliding properties and a long life when the thickness of the friction-reducing material is 0.01-1.5 mm, in particular 0.1-0.35 mm.

The friction-reducing material applied to the intermediate material can in turn also contain a filler material that may improve the thermal conductivity and/or the wear properties. The filler material can include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and bariumsulfate, or any combination thereof. Fillers can be in the form of beads, fibers, powder, mesh, or any combination thereof. The proportion of filler material in the friction-reducing material can be 1-40% by volume, in particular 5-30% by volume.

In an embodiment a process for producing a bearing member can include joining the intermediate material and the friction-reducing material over their area to the support under pressure and with introduction of heat. In such instance, the bearing member can have a body that is a laminated construction, wherein the rigid material is a layer and the friction-reducing material is a layer bonded directly to the surface of the rigid material, or an intervening intermediate material. In forming a laminated construction, the rigid material, the intermediate material, and the friction-reducing material can be rolled off a roll as continuous material and joined to one another under pressure and at elevated temperature in a laminating roller apparatus. To achieve further-improved adhesion of the intermediate material to the rigid material together with improved corrosion properties of the rigid material, an embodiment of the process provides for the surface of the rigid material to be roughed and/or surface-upgraded (e.g. by electrolytic zinc-plating) before application of the intermediate material. Furthermore, the surface of the rigid material can be increased by mechanical structuring, for example by brushing, sandblasting, embossing of a structure.

Figure 5:
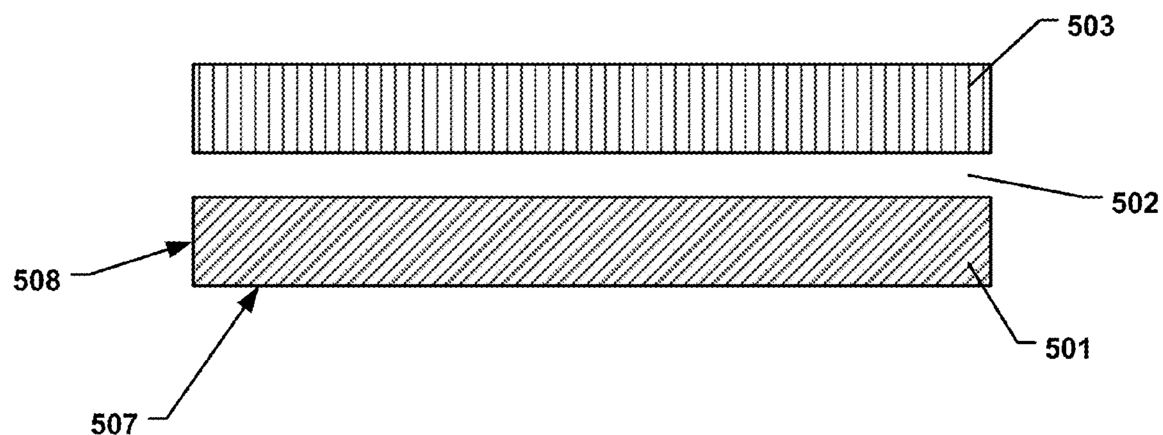
FIG. 5 includes a cross-sectional illustration of a general structure of a bearing member according to an embodiment.

The structure of an exemplary bearing member is shown in FIG. 5. Here, the rigid material is denoted by 501, while 502 denotes the intermediate material, and 503 denotes the friction-reducing material applied thereto.

In an embodiment, the intermediate material 502 comprises at least one functionalized thermoplastic polymer having functional groups of the formula

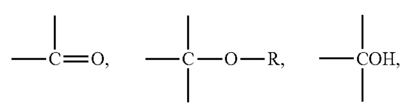

—COOH and/or —COOR, where the radicals R are cyclic or linear organic radicals having from 1 to 20 carbon atoms. The functional groups can be incorporated into the thermoplastic polymer (A) by addition of at least one modifying agent (B). Suitable modifying agents are, for example, maleic acid and derivatives thereof, in particular the anhydride thereof, itaconic acid and derivatives thereof, in particular the anhydride thereof, and/or citraconic acid and derivatives thereof, in particular the anhydride thereof. Here, the ratio of the polymer (A) to the modifying agent (B) can be from 99.9 mol % of (A): 0.1 mol % of (B), to 80 mol % of (A): 20 mol % of (B).

The friction-reducing material 503 applied to the intermediate material 502 can be a PTFE compound tape, in particular as a surface-pretreated, preferably etched, PTFE compound tape. The PTFE compound layer 503 used can contain various fillers to improve the mechanical properties, e.g. fibers, inorganic materials, thermoplastic materials, or mineral materials, or mixtures thereof.

Figure 6:
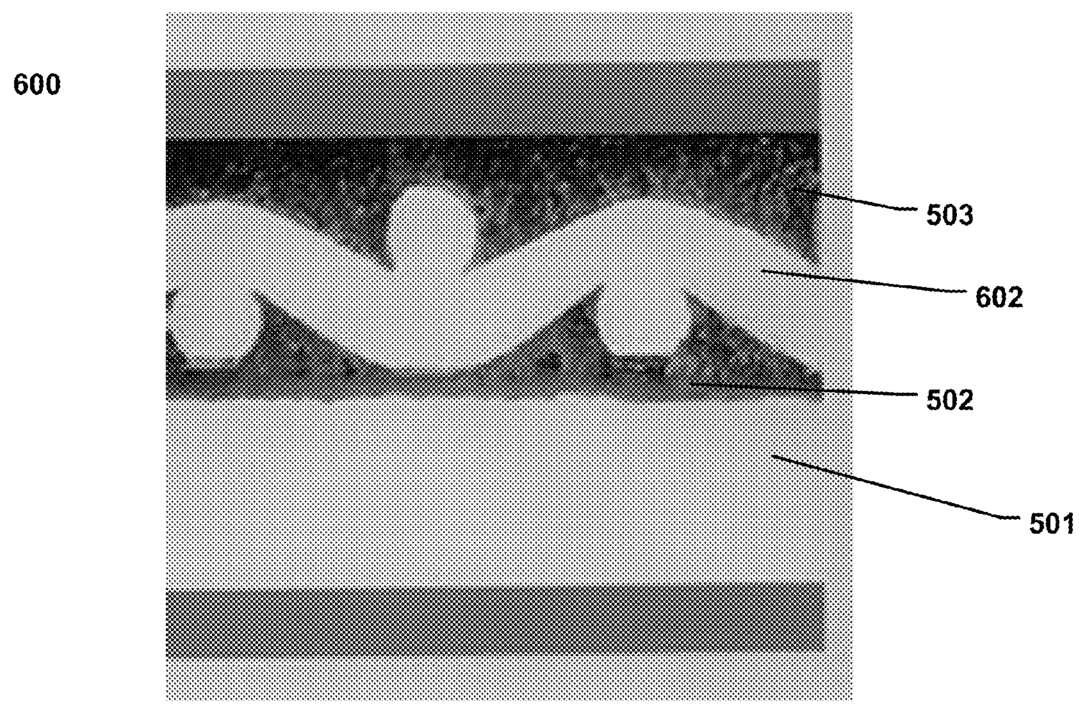
FIG. 6 includes a cross-sectional image of a portion of a bearing member according to an embodiment.

FIG. 6 includes a cross-sectional image of a portion of a bearing member in accordance with an embodiment. As illustrated, the bearing member 600 is a layered structure including those layers noted in accordance with FIG. 5. Furthermore, the bearing member 600 incorporates a woven metal mesh intermediate material 602 made of stainless steel, which can be disposed in direct contact with the friction-reducing material 503. Moreover, to improve the mechanical and general physical properties of the bearing member, the friction-reducing material 503 includes a combination of graphite (carbon) fibers and glass fibers.

As further illustrated, the bearing member can be formed such that the friction-reducing layer 503 and the rigid material 501 can have an average thickness that is approximately the same. That is, the friction-reducing material can have a thickness that is not greater than about 25% different than the average thickness of the rigid material 501 based on the formula $[(Tf-Tr)/Tf]\times 100\%$, wherein Tr is the average thickness of the rigid material and Tf is the average thickness of the friction-reducing material. In other instances, the difference in average thicknesses between the friction-reducing material 503 and the rigid material 501 can be less, such as on the order of not greater than about 15%, not greater than about 10%, not greater 8%, or even not greater than about 5%.

Moreover, unlike other conventional designs, the friction-reducing layer of embodiments herein may be essentially free of porous particles including a metal material. In some embodiments, the friction-reducing layer may be essentially free of large porous particles, such as ZnS.

In certain optional bearing members of the embodiments herein, the body can be formed to include a corrosion resistant coating. The corrosion resistant coating can overlie, and in particular instances, be directly bonded to, an external surface of the rigid material 501. For example, the major surface 507 opposite the major surface of the rigid material 501 having the overlying intermediate layer 502 and friction-reducing layer 503 can include a corrosion resistant coating. Additionally, edge surfaces 508 can be partially or totally covered with a corrosion resistant coating. In particular embodiments, the corrosion resistant coating can overlie an entire edge surface of the bearing body, and accordingly, can overlie all component layers (e.g., rigid material 501, intermediate layer 502, and friction-reducing layer 503) forming the bearing body.

The corrosion resistant coating can have a thickness of between about 1 micron and about 50 microns, such as between about 5 microns and about 20 microns, such as between about 7 microns and 15 microns.

The corrosion resistant coating can be made of a series of films or individual layers that combine to form the corrosion resistant coating. For example, the corrosion resistant coating can include an adhesion promoter layer and an epoxy layer. The adhesion promoter layer can include a phosphate of zinc, iron, manganese, tin, or any combination thereof. Additionally, the adhesion promoter layer can include a nano-ceramic layer. The adhesion promoter layer can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof.

The epoxy layer of the corrosion resistant coating can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include

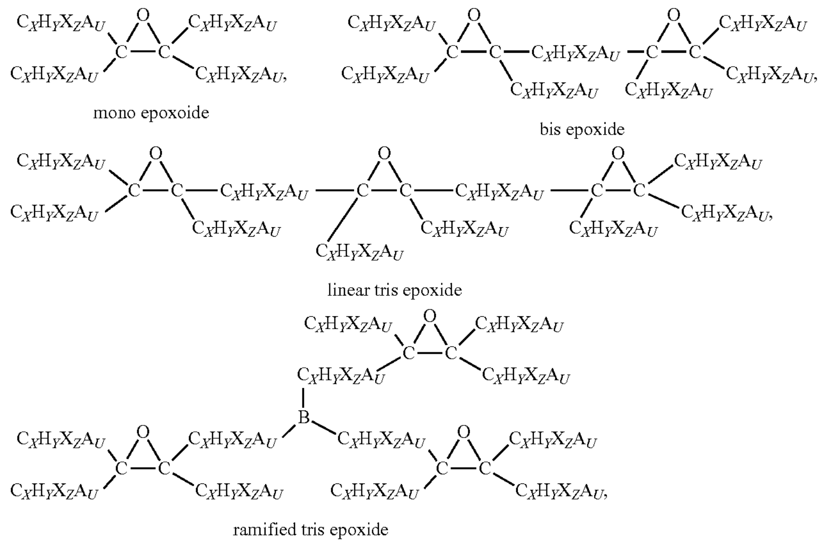

or any combination thereof, wherein $C_XH_YX_ZA_U$ is a linear or ramified saturated or unsaturated carbon chain with optionally halogen atoms $X_Z$ substituting hydrogen atoms, and optionally where atoms like nitrogen, phosphorous, boron, etc, are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C═O—O—C═O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above.

In an embodiment, the epoxy layer can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bearing as compared to a coated bearing without conductive fillers.

In another embodiment, an epoxy layer can increase the corrosion resistance of the bearing. For example, the epoxy layer can substantially prevent corrosive elements, such as water, salts, and the like, from contacting the load bearing substrate, thereby inhibiting chemical corrosion of the load bearing substrate. Additionally, the epoxy layer can inhibit galvanic corrosion of either the housing or the load bearing substrate by preventing contact between dissimilar metals. For example, placing an aluminum bearing without the epoxy layer within a steel housing can cause the steel to oxidize. However, an epoxy layer, such as epoxy layer, can prevent the aluminum substrate from contacting the steel housing and inhibit corrosion due to a galvanic reaction.

The bearing members of the embodiments herein can demonstrate improved operations and characteristics over conventional bearing members. For example, in one embodiment, the bearing members of embodiments herein demonstrate improved resistance to corrosion and weathering. In fact, after exposure to a salt spray for at least about 150 hours, which was conducted according to standard corrosion test ISO 9227:2006, the bearing members of the embodiments herein were essentially free of readily observable defects. In fact, the friction-reducing layer of the bearing members, and particularly, the inner surface at contact with the sliding surface, demonstrated essentially no readily observed corrosion, rusting, tearing, or cracking. In a more particular embodiment, the friction reducing material of the bearing members of embodiments were essentially free of observable defects after salt spray testing for at least 160 hours, at least 170 hours, at least 180 hours, or greater.

According to another embodiment, the bearing members can have a particular weathered wear rate, which is a measure of the wear characteristics of the bearing members after extended exposure to a corrosive environment (i.e., salt spray bath according to ISO 9227:2006) and operation for a particular minimum amount of cycles. The weathered wear rate is a measure of the loss of material from the contact surface for an extended duration in order to test the sliding capabilities of the bearing after exposure to a corrosive environment. Testing procedures for the weathered wear rate are detailed in the Examples. Notably, the weathered wear rate of the bearing members can be not greater than about 0.99 microns/hr for at least about 15,000 cycles of articulating movement. In other instances, the weathered wear rate can be less, such as not greater than about 0.95 microns/hr, not greater than about 0.9 microns/hr, not greater than about 0.85 microns/hr, not greater than about 0.8 microns/hr, not greater than about 0.75 microns/hr, or even not greater than about 0.7 microns/hr for at least about 15,000 cycles of articulating movement.

According to another embodiment, the bearing members of embodiments herein can have a weathered wear rate of not greater than greater than about 0.99 microns/hr for at least about 15,000 cycles of articulating movement. In other instances, the weathered wear rate can be less, such as not greater than about 0.95 microns/hr, not greater than about 0.9 microns/hr, not greater than about 0.85 microns/hr, not greater than about 0.8 microns/hr, not greater than about 0.75 microns/hr, or even not greater than about 0.7 microns/hr for at least about 15,000 cycles of articulating movement. Still, in certain embodiments, the weathered wear rate can be at least about 0.05 microns/hr, at least about 0.08 microns/hr, at least about 0.1 microns/hr, or even at least about 0.15 microns/hr for at least about 15,000 cycles of articulating movement. It will be appreciated that the bearing members of embodiments herein can have a weathered wear rate within a range between any of the minimum and maximum values noted above.

According to another embodiment, the weathered wear rate of the bearing members can be not greater than about 0.99 microns/hr for at least about 20,000 cycles of articulating movement. In other instances, the weathered wear rate can be less, such as not greater than about 0.95 microns/hr, not greater than about 0.9 microns/hr, not greater than about 0.85 microns/hr, not greater than about 0.8 microns/hr, not greater than about 0.75 microns/hr, or even not greater than about 0.7 microns/hr for at least about 20,000 cycles of articulating movement. Still, in certain embodiments, the weathered wear rate can be at least about 0.05 microns/hr, at least about 0.08 microns/hr, at least about 0.1 microns/hr, or even at least about 0.15 microns/hr for at least about 20,000 cycles of articulating movement. It will be appreciated that the bearing members of embodiments herein can have a weathered wear rate within a range between any of the minimum and maximum values noted above.

According to one embodiment, the bearing members of the embodiments herein can have particular wear characteristics, such that after an extended duration of use, the friction-reducing layer demonstrates very little wear. For example, the friction-reducing layer can have a change in average thickness of not greater than 5% after conducting an oscillation test as noted below in the Examples. The change in average thickness can be calculated by $\Delta t=[(tb-ta)/tb]\times100\%$, wherein tb is the average thickness of the friction-reducing layer before testing and to is the average thickness of the friction-reducing layer after testing. According to one embodiment, the change in average thickness is not greater than about 4%, such as not greater than about 3%, not greater than about 2%, not greater than about 1%, or even not greater than about 0.8%.

Moreover, in particular instances, the total amount of wear to the friction-reducing layer of the bearing bodies during the weathered wear test can be limited as compared to other conventional bearings. For example, the total amount of wear can be less than about 6000 microns for at least 15,000 cycles or even at least 20,000 cycles. In other instances, the total amount of wear can be less, such as not greater than about 5900 microns, not greater than about 5800 microns, not greater than about 5500 microns, not greater than about 5000 microns, not greater than about 4500 microns, not greater than about 4000 microns, not greater than about 3500 microns, not greater than about 3000 microns, not greater than about 2500 microns, or even not greater than about 2000 microns for at least 15,000 cycles, such as at least 20,000 cycles.

The bearing members of embodiments herein can have an improved sliding quality over extended durations. For example, the bearing member can have an average friction force of not greater than about 300 N for at least 15,000 cycles in an oscillating test. The oscillating test continuously rotates the bearing member relative to a shaft under controlled conditions, while monitoring the torque of the system to simulate approximately 30 years of use in approximately 11 days of testing. Details of the testing parameters are provided in the Examples. In particular instances, the bearing members demonstrated an average friction force of not greater than about 290 N, such as not greater than about 280 N, not greater than about 270 N, not greater than about 260 N, or even not greater than about 250 N for at least 15,000 cycles in the oscillating test. Still, the bearing members of embodiments herein can have an average friction force of at least about 100 N, such as at least about 150 N, or even at least about 200 N for at least 15,000 cycles in the oscillating test. It will be appreciated that the bearing members of embodiments herein can have an average friction force within a range between any of the minimum and maximum values noted above.

For certain bearing members, the average friction force during the oscillating test can be not greater than about 300 N for at least 20,000 cycles. In other instances, the average friction force can be less, such as not greater about 290 N, not greater than about 280 N, not greater than about 270 N, not greater than about 260 N, or even not greater than about 250 N for at least 20,000 cycles in the oscillating test. Still, the bearing members of embodiments herein can have an average friction force of at least about 100 N, such as at least about 150 N, or even at least about 200 N for at least 20,000 cycles in the oscillating test. It will be appreciated that the bearing members of embodiments herein can have an average friction force within a range between any of the minimum and maximum values noted above.

Furthermore, the bearing articles of embodiments herein can have improved sliding characteristics as measured by the average coefficient of friction under oscillating test conditions for a particular minimum number of cycles and duration. For example, certain bearing articles of embodiments herein demonstrated an average coefficient of friction of not greater about 0.1, such as not greater than about 0.09, not greater than about 0.08, not greater than about 0.07, or even not greater than about 0.06 for at least 15,000 cycles in an oscillating test. Still, the bearing members of embodiments herein can have an average coefficient of friction of at least about 0.01, such as at least about 0.02, or even at least about 0.03 for at least 15,000 cycles in the oscillating test. It will be appreciated that the bearing members of embodiments herein can have an average coefficient of friction within a range between any of the minimum and maximum values noted above.

The bearing articles of embodiments herein can have improved sliding characteristics as measured by the average coefficient of friction under oscillating test conditions for a particular minimum number of cycles and duration. For example, certain bearing articles of embodiments herein demonstrated an average coefficient of friction of not greater about 0.1, such as not greater than about 0.09, not greater than about 0.08, not greater than about 0.07, or even not greater than about 0.06 for at least 20,000 cycles in the oscillating test. Still, the bearing members of embodiments herein can have an average coefficient of friction of at least about 0.01, such as at least about 0.02, or even at least about 0.03 for at least 20,000 cycles in the oscillating test. It will be appreciated that the bearing members of embodiments herein can have an average coefficient of friction within a range between any of the minimum and maximum values noted above.

In particular instances, the bearing members can have an average coefficient of friction within a range between about 0.04 and about 0.059, such as within a range between about 0.040 and about 0.058, or even within a range between about 0.04 and about 0.057 for at least 15,000 cycles, or even at least 20,000 cycles.

EXAMPLE

Three sets of bearing members in the form of simple annular bushings are formed according to embodiments herein. Sample 1 is formed having a steel substrate, intermediate layer of fluoropolymer based material, and a friction-reducing layer of PTFE. Sample 2 is formed of a steel substrate for the rigid material, intermediate layer of fluoropolymer-based material, and a friction reducing layer of PTFE. Sample 3 has a steel substrate for the rigid material, intermediate layer of fluoropolymer based material, and a friction reducing layer of PTFE. Notably, sample 3 includes a corrosion resistance layer overlying the rigid material.

Conventional bushing samples (CS1) are obtained from DuPont Corporation and are available as Derlin® bushings.

Additionally, conventional bushing samples (CS2) are Permaglide® bearings available from Kolbenschmidt Corportion and are formed of a steel backing having a surface protective layer of tin of approximately 0.002 mm thick. The bearings have a sliding layer of PTFE and ZnS of about 25 microns thick, and a top layer of PTFE based compound of about 0.03 mm thick.

Figure 7:
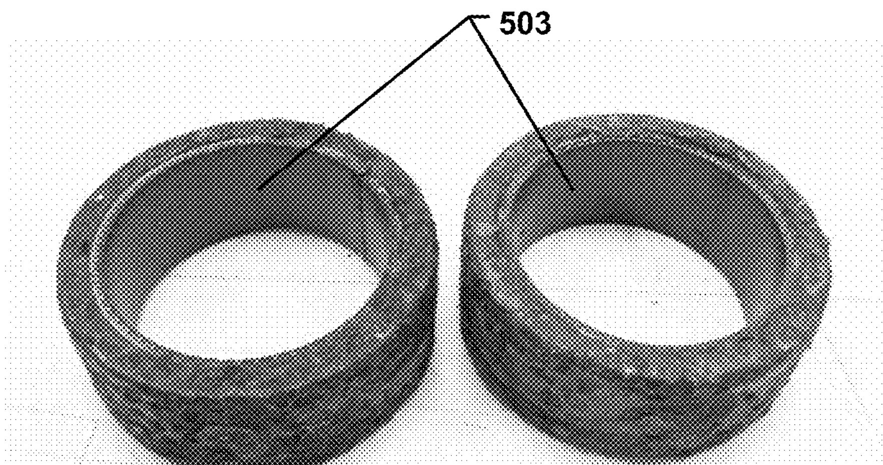
FIG. 7 includes an image of bearing members formed according to embodiments having no observable defects after being exposed to a salt spray test.
Figure 8:
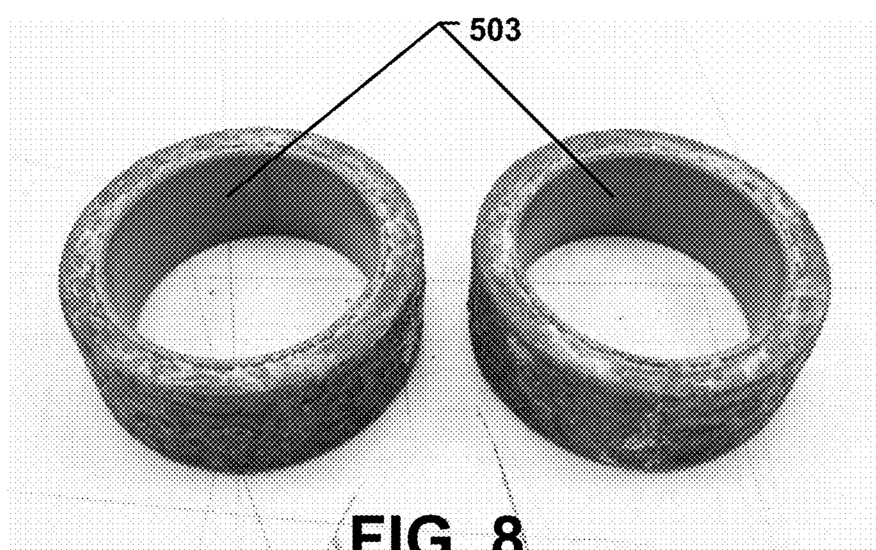
FIG. 8 includes an image of bearing members formed according to embodiments having no observable defects after being exposed to a salt spray test.
Figure 9:
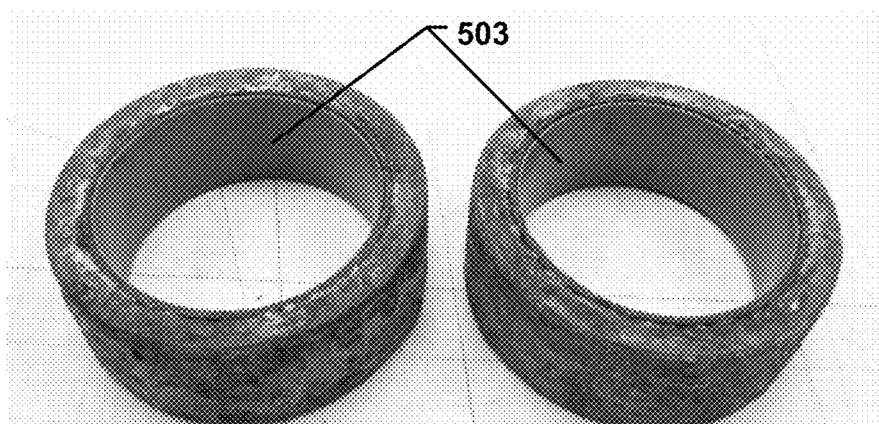
FIG. 9 includes an image of bearing members formed according to embodiments having no observable defects after being exposed to a salt spray test.
Figure 10:
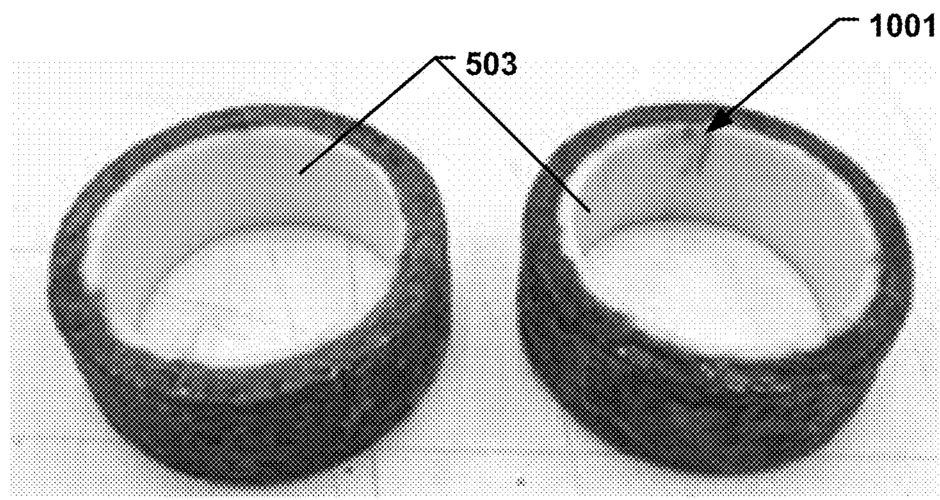
FIG. 10 includes an image of a conventional bearing member having observable defects after being exposed to a salt spray test.
Figure 11:
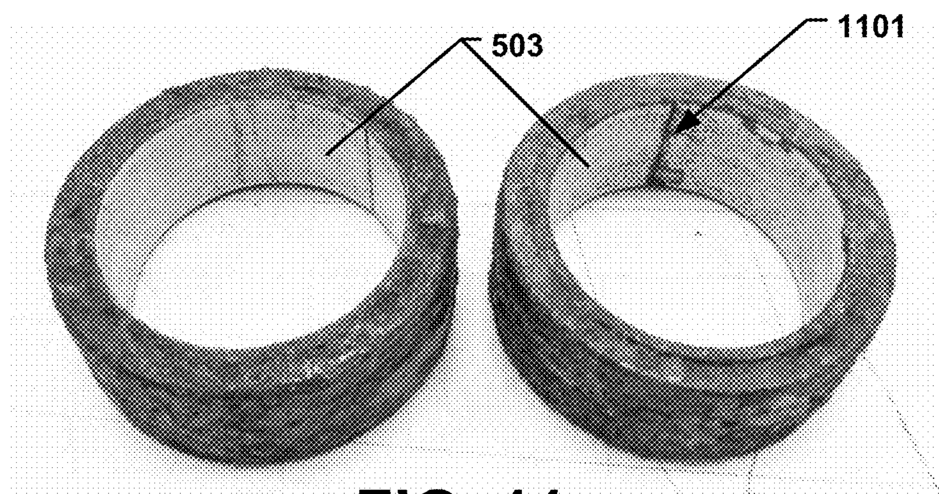
FIG. 11 includes an image of a conventional bearing member having observable defects after being exposed to a salt spray test.

All samples are subject to a salt spray test according to standard corrosion test ISO 9227:2006, to test the corrosion resistance and resistance to corrosive environments. Each of the samples noted above (sample 1-3, CS1, and CS2) are placed in a salt spray booth for 192 hours and exposed to a salt solution of 50+/−5 g/l concentration of salt at 35° C.+/−2° C. degrees. FIGS. 7-9 provide images of bearing members of samples 1, samples 2, and samples 3, respectively after completion of the salt spray test. FIGS. 10-11 include images of the bearing members of samples CS1 and CS2 after exposure to the salt spray test. As clearly illustrated, the samples 1-3 of the embodiments herein demonstrate friction-reducing layers 503 having no visible signs of corrosion, rust, cracking, or other physically observable defects. By contrast, samples CS1 and CS2 clearly demonstrate signs of significant corrosion. CS1 of FIG. 10 has a friction-reducing layer 503 that is cracked and corroded at region 1001. Likewise, to a greater extent, sample CS2 of FIG. 11, demonstrates rusting and cracking through the full width of the friction-reducing layer at region 1101.

Figure 12:
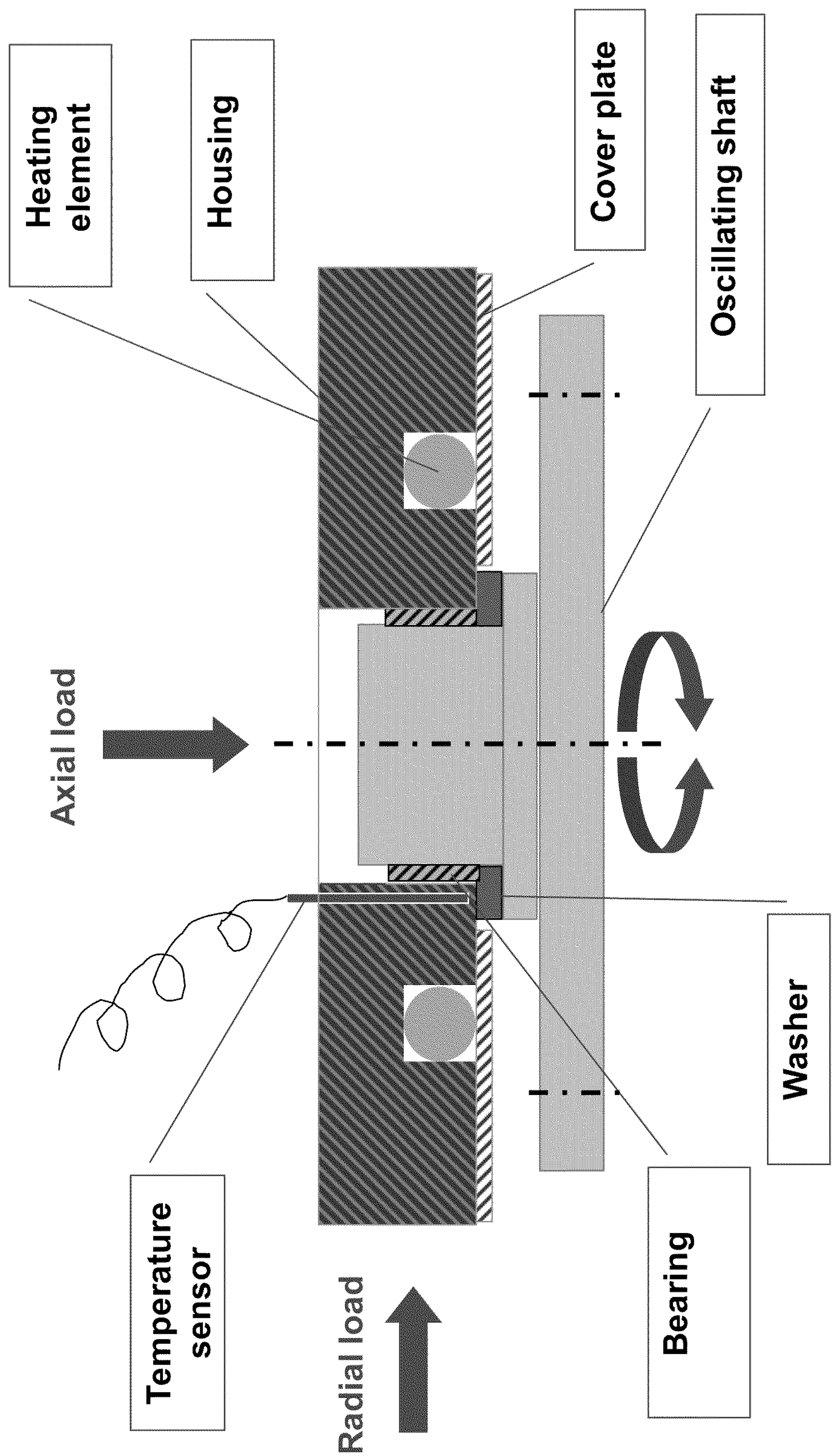
FIG. 12 includes a diagram of a testing set up.

After completing the salt spray test, sample 1, sample 2, sample CS1, and sample CS2 are subject to a weathered wear rate test. The weather wear rate test is set up as illustrated in FIG. 12. The testing conditions are set forth in Table 1 below. The test involved rotation of the shaft (30 mm long 11.6 mm in diameter), having an average surface roughness (Ra) of 2.29 microns and a surface roughness (Rmax) of 20.76 as measured by a Hommel tester along an axial direction, within the bearing member to simulate approximately 30 years of wear

TABLE 1

| Parameter | Set value |
|---|---|
| Frequency | 0.02 Hz |
| Period time | 50 s |
| Tilting Angle | ±30° |
| Radial Load | 4374 N |
| Axial Load | 50 N |
| Total Cycles | 20,075 |
| Duration | 11 d + 15 hrs. |

The results of the test are provided below in Table 2. Notably, the measured wear rate, total wear, and coefficient of friction (COF) are reported. As illustrated, the wear rate and total amount of wear for samples 1 and 2 are better than the wear rate and total wear for samples CS1 and CS2, which demonstrate limited sliding ability due to corrosion for samples 1 and 2. The coefficient of friction for samples 1 and 2 was also lower than the coefficient of friction for samples CS1 and CS2 in all cases demonstrating that the corrosive environment had a greater effect on the samples CS1 and CS2 than samples 1 and 2. Thus samples 1 and 2 demonstrate improved lifetime, efficiency of operation, and improved wear resistance after exposure to a corrosive environment as compared to the conventional samples.

TABLE 2

| Sample | Wear [μm] | Wear rate [μm/h] | COF |
|---|---|---|---|
| Sample 2 | 1,500 | 0.250 | 0.0577 |
| Sample 1 | 5,700 | 0.950 | 0.0401 |
| Sample 1 | 1,800 | 0.300 | 0.0515 |
| Sample CS2 | 6,000 | 1,000 | 0.0652 |
| Sample CS2 | 8,700 | 1,450 | 0.0585 |
| Sample CS1 | 28,000 | 4,667 | 0.0686 |
| Sample CS1 | 40,700 | 6,783 | 0.0863 |

EXAMPLE 2

Sample 1 also undergoes an oscillating test to determine the efficiency of operation and wear characteristics over a simulated time of 30 years. The test set up and test parameters are the same as for the weathered wear resistance test as noted in Example 1, however, sample 1 is not subject to a corrosive environment.

Figure 13:
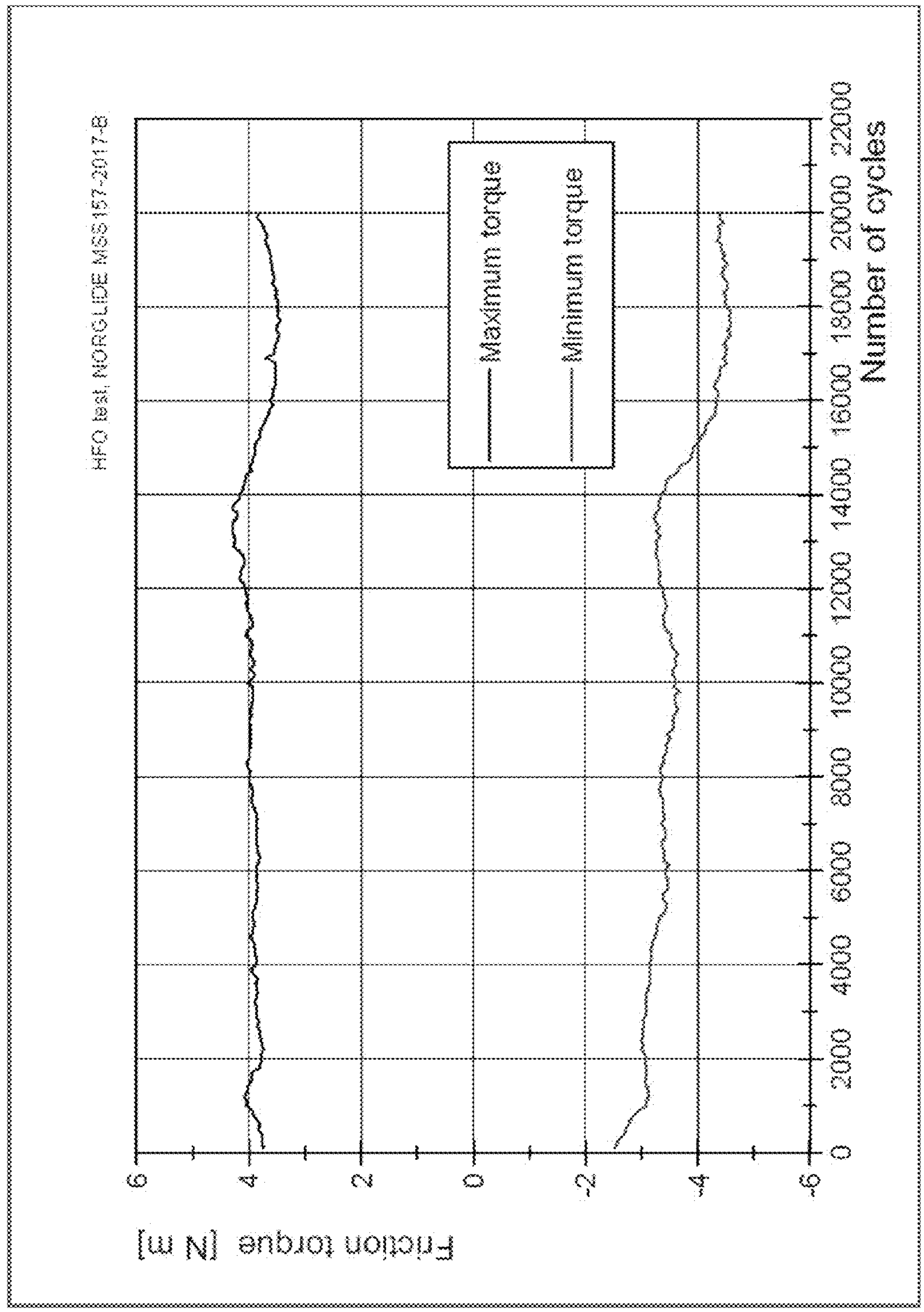
FIG. 13 includes a plot of friction torque versus number of cycles for a bearing member formed according to an embodiment.

FIG. 13 includes a plot of friction torque versus number of cycles for the entire oscillating test for sample 1. As illustrated, sample 1 demonstrates substantially no change in average torque throughout the testing. Sample 1 is calculated to have an average friction force of 249 N and an average coefficient of friction of 0.057.

Figure 14:
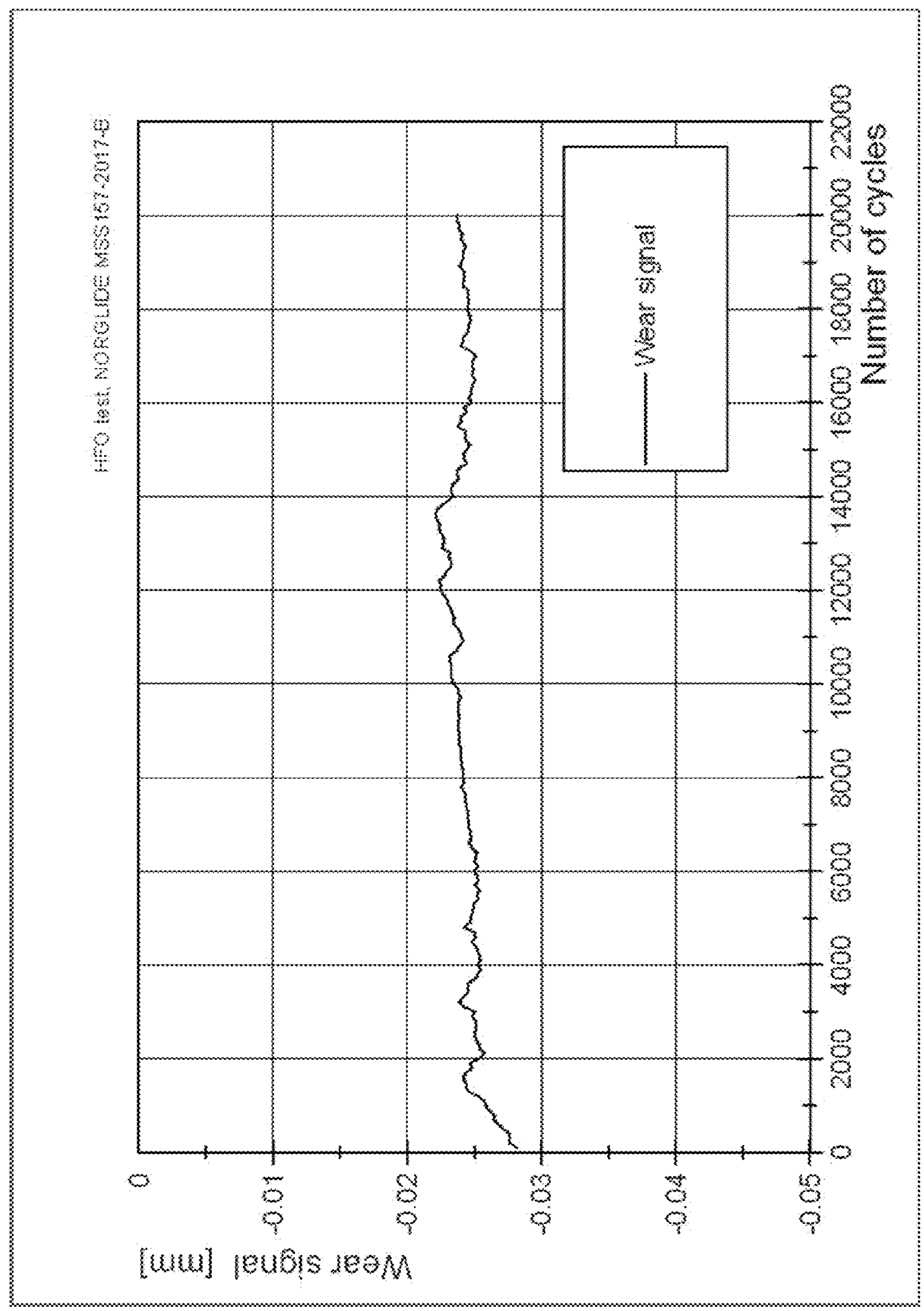
FIG. 14 includes a plot of wear versus number of cycles for a bearing member formed according to an embodiment.

FIG. 14 includes a plot of wear signal (microns) versus number of cycles for sample 1 during the oscillation test. The wear depth was calculated by a micrometer, wherein the average wall thickness of the friction-reducing layer before testing was 1.568 mm and after testing of 20,000 cycles the average wall thickness of the friction-reducing layer was 1.558 mm, for a change of 0.01 mm. The wear rate of sample 1 during testing was 0.6% of the original wall thickness of the friction-reducing layer. Clearly, sample 1 demonstrates efficient sliding capabilities and very low wear.

The embodiments herein are directed to power generation structures having articulating joints that can utilize a bearing member within the articulating joint. The bearing members can have a body made of a composite including a rigid material, friction-reducing material, and an intermediate material disposed between the rigid material and the friction-reducing material. The bearing members of embodiments herein can utilize one or more combinations of features, including particular rigid materials, thicknesses of the rigid material, particular intermediate materials, thicknesses of the intermediate material, particular friction-reducing materials, thicknesses of the rigid material, dimensions of the bearing member, and certain mechanical properties (e.g., stiffness), and chemical inertness that are desired in the industry. In particular, the bearing members of embodiments herein can have a particular combination of mechanical characteristics such as corrosion resistance, wear resistance, and stick-slip performance properties, which are an improvement over conventional bearing members.

Generally, state-of-the-art power generation structures may have incorporated certain composite bearing members in the form of simple bushings and the like. However, the bearing members of embodiments herein have replaced many of the state-of-the-art bearing members in power generation structures, particularly in the solar power generation industry. In fact, the bearing members of embodiments herein have supplanted many old bearings in such a manner that the bearing members herein now represent a significant portion of the market in certain renewable energy resource industries.

The foregoing describes a combination of features, which can be combined in various manners to describe and define the bonded abrasive articles of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A power generation structure for generating power from a renewable energy source comprising:

a base;

an energy conversion structure connected to the base; and an articulating joint between the base and the energy conversion structure, the articulating joint comprising a bearing member having a body, the body having a cylindrical shape around an axis with an inner surface and an outer surface, wherein the inner surface is closer to the axis, the body further including a composite material having a laminated construction comprising a rigid material, a friction-reducing material overlying the rigid material, the friction-reducing material forming the inner surface, an intermediate material disposed between the rigid material and the friction-reducing material, and a corrosion resistant coating overlying the rigid material, wherein the corrosion resistant coating overlies the rigid material opposite the friction-reducing material, wherein the corrosion resistant coating overlies all of the rigid material except for portions covered by the friction-reducing material, wherein the rigid material comprises a material selected from aluminum or stainless steel, wherein the intermediate material comprises at least one functionalized thermoplastic polymer, wherein the at least one functionalized thermoplastic polymer includes an ethylene-tetrafluoroethylene copolymer (ETFE), perfluoroalkoxy ethylene (PFA), or tetrafluoroethylene-perfluoro(methyl vinyl ether) copolymer (MFA), the functionalized thermoplastic polymer further having functional groups of the formula

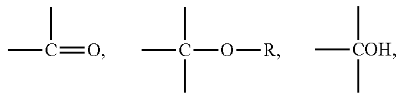

—COOH, or —COOR, where the radicals R are cyclic or linear organic radicals having from 1 to 20 carbon atoms.

2. The structure of claim 1, wherein the bearing member comprises a bushing.

3. The structure of claim 1, wherein the bearing member comprises a split extending axially along the body.

4. The structure of claim 1, wherein the energy conversion structure is configured to generate electrical energy from a natural energy source selected from the group of natural energy sources consisting of wind, solar, water, and geothermal.

5. The structure of claim 1, wherein the friction-reducing material comprises an average thickness within a range between about 0.1 mm to 10 mm.

6. The structure of claim 1, wherein the intermediate material comprises an average thickness corresponding to a surface roughness of the rigid material.

7. The structure of claim 1, wherein the intermediate material contains a filler material for changing the thermal conductivity relative to an intermediate material without the filler material.

8. The structure of claim 1, wherein the intermediate material contains a filler material selected from the group consisting of fibers, inorganic materials, thermoplastic materials, and mineral materials.

9. The structure of claim 1, wherein the body of the bearing member comprises an outer diameter of at least about 50 mm.

10. The structure of claim 9, wherein the outer diameter of the body of the bearing member is within a range between about 50 mm and about 1000 mm.

11. A power generation structure for generating power from a renewable energy source comprising:

a base;

a solar panel connected to the base at an articulating joint configured to allow movement of the solar panel relative to the base, wherein the articulating joint includes a bushing having a body, the body having a cylindrical shape around an axis with an inner surface and an outer surface, wherein the inner surface is closer to the axis, the body further made of a composite material having a laminated construction comprising a rigid material, a friction-reducing material overlying the rigid material, the friction-reducing material forming the inner surface, an intermediate material disposed between the rigid material and the friction-reducing material, and a corrosion resistant coating overlying the rigid material, wherein the corrosion resistant coating overlies the rigid material opposite the friction-reducing material, wherein the corrosion resistant coating overlies all of the rigid material except for portions covered by the friction-reducing material, wherein the rigid material comprises a material selected from aluminum or stainless steel, wherein the intermediate material comprises at least one functionalized thermoplastic polymer polymer, wherein the at least one functionalized thermoplastic polymer includes an ethylene-tetrafluoroethylene copolymer (ETFE), perfluoroalkoxy ethylene (PFA), or tetrafluoroethylene-perfluoro (methyl vinyl ether) copolymer (MFA), the functionalized thermoplastic polymer further having functional groups of the formula

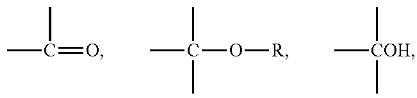

—COOH, or —COOR, where the radicals R are cyclic or linear organic radicals having from 1 to 20 carbon atoms, and wherein the friction-reducing material comprises a fluoropolymer and a material selected from the group of materials consisting of graphite, or glass.

12. The structure of claim 11, wherein the corrosion resistant coating includes an epoxy resin layer.

13. A power generation structure for generating power from a renewable energy source comprising:

an energy conversion structure comprising an articulating joint configured to move at least a portion of the energy conversion structure; and a bearing member connected to the articulating joint, the bearing member having a body, the body having a cylindrical shape around an axis with an inner surface and an outer surface, wherein the inner surface is closer to the axis, the body further including a composite material having a laminated construction comprising a rigid material, the rigid material forming the outer surface, a friction-reducing material overlying the rigid material, the friction-reducing material forming the inner surface, the friction-reducing material including a fluoropolymer, an intermediate material disposed between the rigid material and the friction-reducing material, wherein the intermediate material comprises at least one functionalized thermoplastic polymer, wherein the at least one functionalized thermoplastic polymer includes an ethylene-tetrafluoroethylene copolymer (ETFE), perfluoroalkoxy ethylene (PFA), or tetrafluoroethylene-perfluoro(methyl vinyl ether) copolymer (MFA), and a corrosion resistant coating overlying the rigid material, wherein the corrosion resistant coating overlies the rigid material opposite the friction-reducing material, wherein the corrosion resistant coating overlies all of the rigid material except for portions covered by the friction-reducing material, wherein the friction reducing material is free of observable defects after salt spray testing for at least 150 hours according to standard corrosion test ISO 9227:2006.

* * * * *